(12) United States Patent
Shinjo

(10) Patent No.: US 8,931,160 B2
(45) Date of Patent: Jan. 13, 2015

(54) METHOD FOR FIXING PIERCING NUT

(75) Inventor: Tadashi Shinjo, Kishiwada (JP)

(73) Assignee: Shinjo Manufacturing Co., Ltd., Kishiwada-Shi (JP)

( * ) Notice: Subject to any disclaimer, the term of this patent is extended or adjusted under 35 U.S.C. 154(b) by 582 days.

(21) Appl. No.: 12/975,361

(22) Filed: Dec. 22, 2010

(65) Prior Publication Data

US 2012/0124812 A1    May 24, 2012

(30) Foreign Application Priority Data

Nov. 22, 2010    (JP) .................................. 2010-259692

(51) Int. Cl.
B23P 11/00 (2006.01)

(52) U.S. Cl.
USPC ............... 29/512; 29/515; 29/432.1; 411/179

(58) Field of Classification Search
USPC ..................... 29/432.1–432.2, 512, 520–525; 411/180–182
See application file for complete search history.

(56) References Cited

U.S. PATENT DOCUMENTS

| | | | |
|---|---|---|---|
| 2,707,322 A | | 5/1955 | Strain et al. |
| 3,152,628 A | * | 10/1964 | Strain et al. ................... 411/179 |
| 3,399,705 A | * | 9/1968 | Breed et al. ................... 411/180 |
| 4,610,072 A | * | 9/1986 | Muller ............................. 29/512 |
| 5,549,430 A | * | 8/1996 | Takahashi et al. ............. 411/179 |
| 6,276,040 B1 | * | 8/2001 | Muller ........................... 29/432.2 |
| 6,732,431 B2 | * | 5/2004 | Muller ............................. 29/874 |
| 6,893,198 B2 | * | 5/2005 | Couillais et al. ............... 411/181 |
| D557,132 S | * | 12/2007 | Shinjo ............................. D8/397 |
| 2001/0011039 A1 | * | 8/2001 | Shinjo ............................. 470/106 |
| 2004/0181937 A1 | * | 9/2004 | Woods ............................. 29/798 |
| 2005/0158141 A1 | * | 7/2005 | Shinjo ............................. 411/180 |
| 2005/0180838 A1 | * | 8/2005 | Shinjo ............................. 411/179 |

FOREIGN PATENT DOCUMENTS

| | | |
|---|---|---|
| DE | 3626466 | 2/1988 |
| EP | 2226520 | 9/2010 |
| JP | 58-042817 | 3/1983 |
| JP | 62-156036 | 7/1987 |
| JP | 64-58807 | 3/1989 |
| JP | 3124357 B2 | 8/1993 |
| JP | 07-151126 | 6/1995 |

(Continued)

OTHER PUBLICATIONS

Extended European Search Report for corresponding EP Application No. 10196750.3-1262, Jul. 28, 2011.

(Continued)

*Primary Examiner* — Minh Trinh
(74) *Attorney, Agent, or Firm* — Mori & Ward, LLP

(57) ABSTRACT

A method for fixing a piercing nut includes placing on a punching die a metal plate. A pilot portion is provided at a bearing surface of a nut main body of the piercing nut. A height from the bearing surface to an end face of the pilot portion is smaller than a thickness of the metal plate. The pilot portion is pressed to a first surface of the metal plate to be struck into the metal plate so that an inner peripheral surface of a punching opening portion of the metal plate engages with an outer peripheral surface of the pilot portion to fix the piercing nut to the metal plate. The end face is positioned between the first surface and a second surface of the metal plate. A punching slag is downwardly pushed to discharge the punching slag to a punching hole of the punching die.

14 Claims, 8 Drawing Sheets

(56) References Cited

FOREIGN PATENT DOCUMENTS

| | | |
|---|---|---|
| JP | 8-29392 B2 | 7/1995 |
| JP | 2816645 B2 | 9/1995 |
| JP | 09-024427 | 1/1997 |
| JP | 09-24427 | 1/1997 |

OTHER PUBLICATIONS

Chinese Office Action for corresponding CN Application No. 201010609859.4, Dec. 9, 2013.
Japanese Office Action for corresponding JP Application No. 2010-259692, Oct. 12, 2012.

* cited by examiner

METHOD FOR FIXING PIERCING NUT

CROSS-REFERENCE TO RELATED APPLICATION

The present application claims priority under 35 U.S.C. §119 to Japanese Patent Application No. 2010-259692 filed Nov. 22, 2010. The contents of this application are incorporated herein by reference in their entirety.

BACKGROUND OF THE INVENTION

1. Field of the Invention

The present invention relates to a method for fixing a piercing nut.

2. Discussion of the Background

The conventional piercing nut is structured such that the pilot portion punches out the metal plate so as to pass therethrough, and caulks a peripheral edge portion of the punched through hole so as to be fixed to the metal plate.

For example, a rectangular type piercing nut (commonly called a universal type or a flat type) which has been known by U.S. Pat. No. 2,707,322, U.S. Pat. No. 3,152,628 and the like is the most basic structure, however, on the grounds that an embossing (see FIG. 5 of U.S. Pat. No. 2,707,322) is necessary in the metal plate portion of the nut punching portion, in order to prevent the pilot portion which is large scaled and punches out the metal plate so as to pass through from protruding from a lower surface of the metal plate so as to work against a thread fastening work, it has been hardly used at present.

On the other hand, there has been known, for example, from Japanese Examined Patent Publication No. 8-29392, Japanese Patent No. 2816645, Japanese Patent No. 3124357 and the like, a piercing nut in which a side wall protruding in such a manner as to surround the pilot portion is provided along an outer peripheral edge of a nut main body, an annular groove is formed between the pilot portion and the side wall, and the nut main body is formed into a quadrangular shape or a hexagonal shape and an outline shape of the annular groove is formed into a noncircular shape in order to improve a rotational drag (a force preventing a rotating motion of the piercing nut), as a high-stress type (or concave type) piercing nut.

In the high-stress type (or concave type) piercing nut mentioned above, since a height of the pilot portion punching out the metal plate so as to pass through is larger than a thickness of the metal plate, and the annular groove is provided, a whole of the piercing nut becomes large in scale. Further, it is necessary to provide a caulking projection in an upper surface of a punching die for pressure inserting a punched peripheral edge portion of the metal plate punched by the pilot portion to the annular groove, and there is a problem that a frequency of fracture is extremely increased in the case that the metal plate becomes thicker, in the caulking projection.

SUMMARY OF THE INVENTION

According to one aspect of the present invention, a method for fixing a piercing nut includes placing on a punching die a metal plate having a first surface and a second surface opposite to the first surface in a thickness direction of the metal plate so that the second surface comes into contact with the punching die. A pilot portion having a center axis is provided at a bearing surface of a nut main body of the piercing nut to protrude from the bearing surface to serve as a piercing punch. A height from the bearing surface to an end face of the pilot portion is smaller than a thickness of the metal plate. The nut main body includes a thread hole having the center axis. The pilot portion of the piercing nut is pressed to the first surface of the metal plate placed on the punching die to be struck into the metal plate so that the bearing surface of the nut main body comes into contact with the first surface of the metal plate and an inner peripheral surface of a punching opening portion of the metal plate engages with an outer peripheral surface of the pilot portion to fix the piercing nut to the metal plate. The end face of the pilot portion is positioned between the first surface and the second surface of the metal plate without passing through the metal plate to leave a punching slag between the punching opening portion of the metal plate and a punching hole of the punching die. The punching slag is downwardly pushed by moving a protruding pin downwardly in the thread hole of the piercing nut to discharge the punching slag to the punching hole of the punching die.

According to another aspect of the present invention, a method for fixing a piercing nut includes placing on a punching die a metal plate having a first surface and a second surface opposite to the first surface in a thickness direction of the metal plate so that the second surface comes into contact with the punching die. A pilot portion having a center axis is provided at a bearing surface of a nut main body of the piercing nut to protrude from the bearing surface to serve as a piercing punch. The nut main body includes a thread hole having the center axis. A height from the bearing surface to an end face of the pilot portion is 60% to 90% of a thickness of the metal plate. A clearance is a half of a difference between an outer diameter of the pilot portion and an inner diameter of a punching hole of the punching die. The clearance is set in such a manner that a shear of the metal plate by pushing the pilot portion is completed at about 50% of the thickness of the metal plate. The pilot portion of the piercing nut is pressed to the first surface of the metal plate placed on the punching die to be struck into the metal plate so that the bearing surface of the nut main body comes into contact with the first surface of the metal plate and an inner peripheral surface of a punching opening portion of the metal plate engages with an outer peripheral surface of the pilot portion to fix the piercing nut to the metal plate. The end face of the pilot portion is positioned between the first surface and the second surface of the metal plate without passing through the metal plate to leave a punching slag between the punching opening portion of the metal plate and the punching hole of the punching die. The punching slag is downwardly pushed by moving a protruding pin downwardly in the thread hole of the piercing nut to discharge the punching slag to the punching hole of the punching die.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIGS. 1A and 1B show a piercing nut used in a fixing method according to an embodiment of the present invention, in which FIG. 1A is a perspective view as seen from a top surface side, and FIG. 1B is a perspective view as seen from a bottom surface side;

FIGS. 4A, 4B and 4C are explanatory views of a measurement test for setting a clearance of FIG. 3, in which FIG. 4A shows a preparation state of pressurizing the piercing nut by a pressure rod, FIG. 4B shows a shear completion state by a pilot portion of the piercing nut, and FIG. 4C shows a punching completion state of the piercing nut;

FIGS. 6A, 6B and 6C are explanatory views showing a punching and fixing step of the piercing nut, in which FIG. 6A shows a punching start state, FIG. 6B shows a shear completion and fixing state, and FIG. 6C shows a punching completion state;

FIGS. 7A, 7B and 7C show a modified example of the piercing nut used in the fixing method according to an embodiment of the present invention, the piercing nut being a round type piercing nut having a columnar shaped nut main body, in which FIG. 7A is a plan view, FIG. 7B is a partly vertical cross sectional front view, and FIG. 7C is a bottom view; and FIGS. 8A, 8B and 8C show another modified example of the piercing nut used in the fixing method according to an embodiment of the present invention, the piercing nut being a rectangular type piercing nut having a rectangular shaped nut main body, in which FIG. 8A is a plan view, FIG. 8B is a partly vertical cross sectional front view, and FIG. 8C is a bottom view.

DESCRIPTION OF THE EMBODIMENTS

Figure 1A:
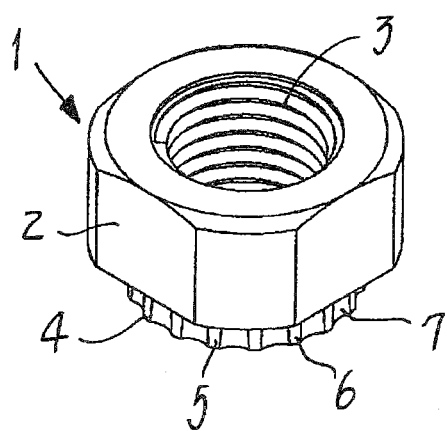
Figure 1B:
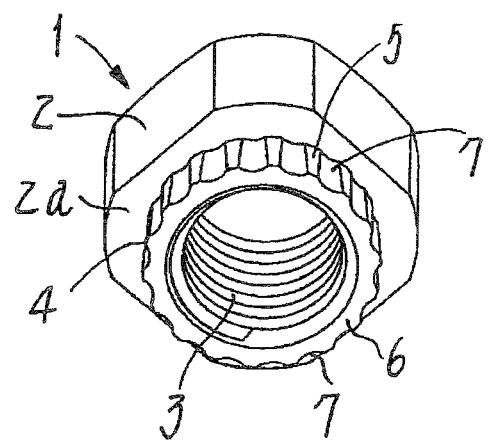
Figure 2A:
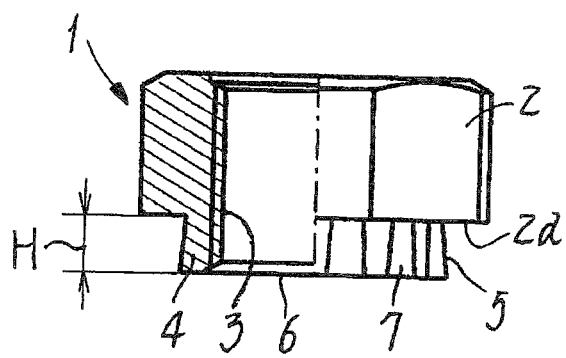
FIG. 2A is a partly vertical cross sectional front view of the piercing nut and FIG. 2B is a bottom view of the piercing nut.
Figure 2B:
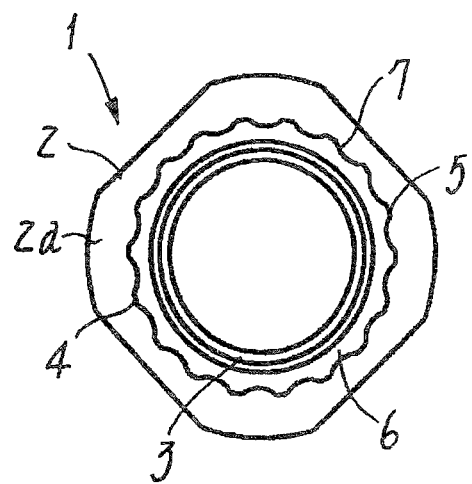

The embodiments will now be described with reference to the accompanying drawings, wherein like reference numerals designate corresponding or identical elements throughout the various drawings.

FIGS. 1A, 1B, 2A and 2B show a piercing nut 1 used in a fixing method according to the embodiment of the present invention. In the piercing nut 1, a nut main body 2 is of a corner rounded quadrangular type in which corner portions of a quadrangular nut are rounded, and a cylindrical pilot portion 4 serving as a piercing punch is provided in a protruding manner in a center portion including a thread hole 3 of the nut main body 2. An outer peripheral surface 5 of the pilot portion 4 is formed into a tapered shape which is slightly contracted from an end face 6 toward a root, that is, a bearing surface 2a of the nut main body 2. Further, the outer peripheral surface 5 is provided with a plurality of concave grooves 7 which extend approximately in parallel to an axis at even intervals in a peripheral direction, and each of the concave grooves 7 is formed into a circular arc shape having a shallow cross sectional shape.

Figure 3:
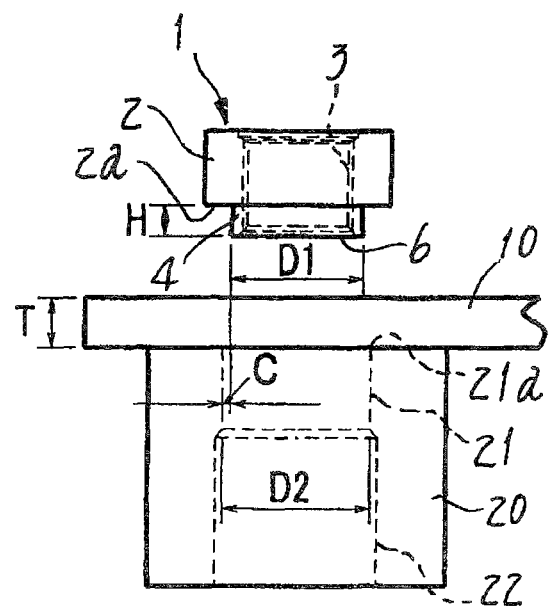
FIG. 3 is an explanatory view showing a positional relationship and a dimensional relationship among the piercing nut, a metal plate for fixing the piercing nut, and a punching die.

FIG. 3 shows a positional relationship and a dimensional relationship among the piercing nut 1 mentioned above, a metal plate 10 to which the piercing nut 1 is fixed, and a punching die 20.

The fixing method according to the embodiment of the present invention includes striking the pilot portion 4 of the piercing nut 1 into the metal plate 10 mounted on an upper face of the punching die 20, carrying out a punching work by the pilot portion 4, and fixing the piercing nut to the metal plate 10. However, a height (H) of the pilot portion 4 is made smaller than a thickness (T) of the metal plate 10, and the punching work by the pilot portion 4 is carried out without passing through the metal plate 10 until a shearing is completed. Accordingly, the height (H) of the pilot portion 4 is set to 60% to 90% of the thickness (T) within a range which does not pass through the metal plate 10, based on 60% of the thickness (T), for fixing the piercing nut to the metal plate 10 while securing a sufficient clinching force. On the other hand, in the case of punching the metal plate 10, a shear and a fracture are generated, however, a substantial punching work is finished at a time point when the shearing is completed. At this time, a shear length is determined by a half of a difference in dimension between an outer diameter (D1) of the pilot portion 4 and an inner diameter (D2) of a punching hole 21 of the punching die 20, that is, a magnitude of a clearance (C) which is defined by an expression (D2−D1)/2. In the case that the clearance (C) is small, the shear length becomes larger, and in the case that the clearance (C) is large, the shear length becomes smaller. In the embodiment of the present invention, the clearance (C) is set in such a manner that the shear of the punching work by the pilot portion 4 is completed in the vicinity of 50% of the thickness (T) of the metal plate 10, while taking into consideration the height (H) of the pilot portion 4.

Figure 4A:
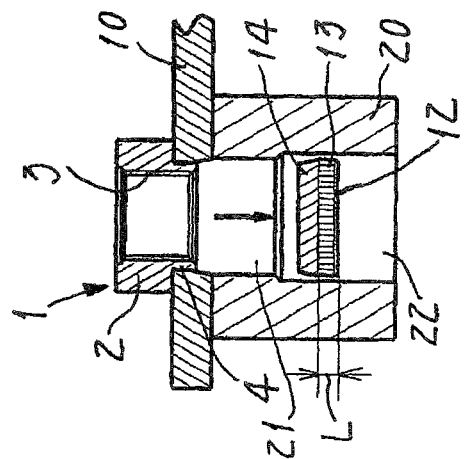
Figure 4B:
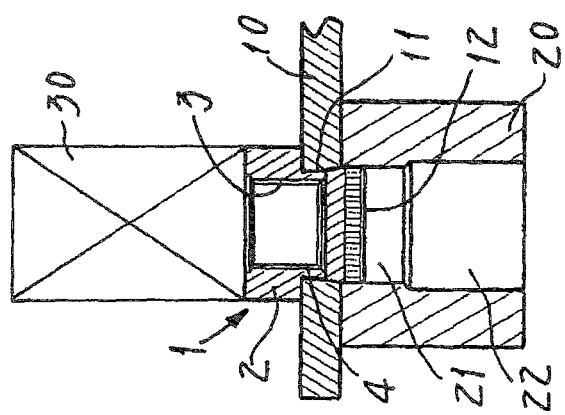
Figure 4C:
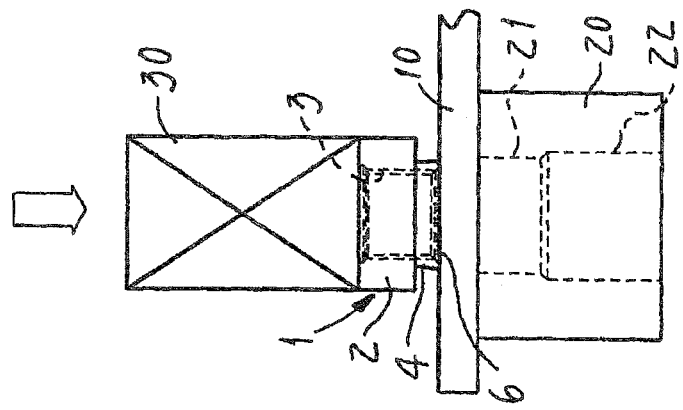

FIGS. 4A to 4C are explanatory views of a measurement test for setting the clearance (C). The punching die 2 has the punching hole 21 with an inner diameter (D2) which is larger than an outer diameter (D1) of the pilot portion 4 of the piercing nut 1, positions the piercing nut 1 with respect to the metal plate 10 which is mounted on the upper face of the punching die 20 coaxially with the punching die 20, pressurizes a pressure rod 30 coming into contact with the piercing nut 1 by a universal testing machine (not shown), and strikes the pilot portion 4 into the metal plate 10 so as to carry out a punching work. If the applied pressure of the pressure rod 30 is going to be increased, the punching work by the pilot portion 4 makes progress, and when the shearing is completed as shown in FIG. 4B, the applied pressure of the pressure rod 30 is rapidly lowered, and the punching work is substantially finished. With the punching work by the pilot portion 4, a punching opening portion 11 and a punching slag 12 are generated in the metal plate 10.

Figure 5:
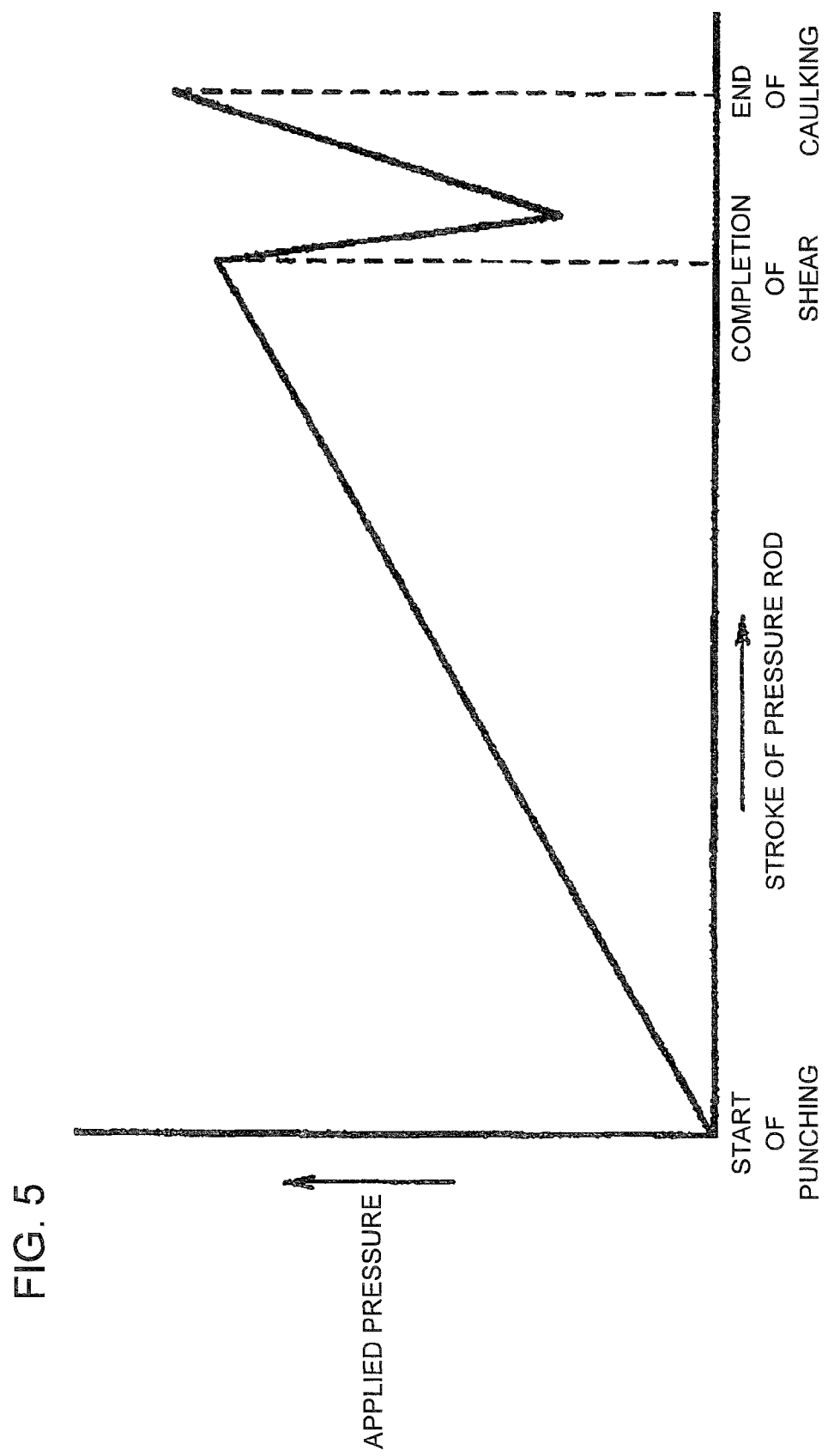
FIG. 5 is a graph showing a change of an applied pressure to the piercing nut by the pressure rod in the measurement test shown in FIGS. 4A to 4C.

Further, when the pressure rod 30 is pushed down, the applied pressure to the piercing nut 1 is increased (see FIG. 5), the bearing surface 2a of the nut main body 2 is pressed to the metal plate 10, and the pilot portion 4 is caulked by the punching opening portion 11 so as to be fixed to the metal plate 10. On the other hand, since a shear surface 13 and a fracture surface 14 are formed in an outer peripheral surface of the punching slag 12 generated by the punching work, as shown in FIG. 4C, a length (L) of the shear surface 13 of the protruding punching slag 12 is measured by a pin (not shown).

The test measurement mentioned above is repeatedly carried out by using the punching die 20 having a different inner diameter (D2) of the punching hole 21, thereby selecting the punching die 20 with the punching hole 21 having an inner diameter (D2) in which the length (L) of the shear surface 13 of the punching slag 12 is about 50% of the thickness (T) of the metal plate 10. A half of a difference in dimension between the inner diameter (D2) of the punching hole 21 of the punching die 20 selected as mentioned above and the outer diameter (D1) of the pilot portion 4, that is, the clearance (C) in FIG. 3 which is defined by the expression (D2−D1)/2 is set as an optimum clearance. The clearance (C) differs depending on the material of the metal plate 10, however, as a result of the measurement test mentioned above, it has been found that it is typically in a range between 7% and 16% of thickness (T).

Example

Outer diameter D1 of the pilot portion 4 of the piercing nut 1: 22.4 mm

Height H of the pilot portion 4 of the piercing nut 1: 5.0 mm

Inner diameter D2 of the punching hole 21 of the punching die 20: 24.5 mm

In the case that the metal plate 10 is a steel plate, strength: 880 Mpa, thickness T: 8.0 mm Clearance C: 1.05 mm (13.1% of thickness T: 8.0 mm)

At a time of setting as mentioned above, striking the pilot portion 4 of the piercing nut 1 into the metal plate 10 mounted on the upper face of the punching die 20, and punching and fixing, a shear load is 29 tons, and the length (L) of the shear surface 13 of the punching slag 12 was about 50% of the thickness (T) of the metal plate 10. Further, a drop load protruding the punching slag 12 was about 100 kg.

Figure 6A:
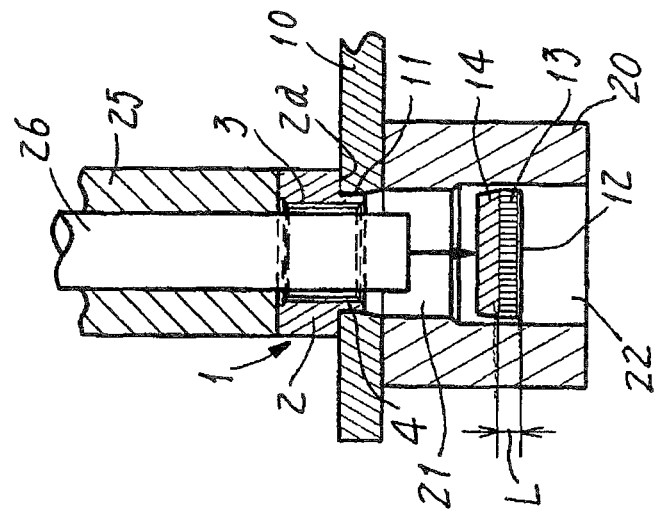
Figure 6B:
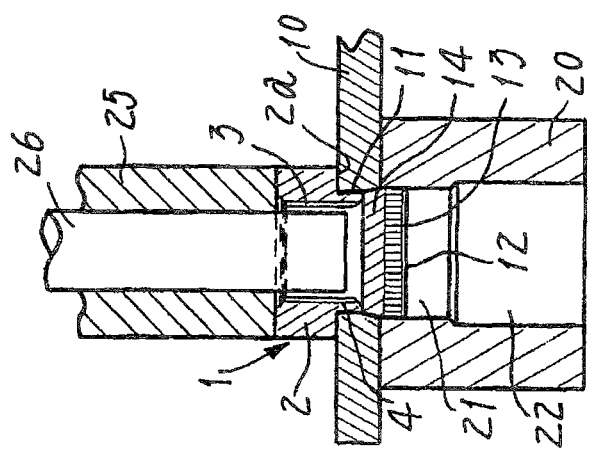
Figure 6C:
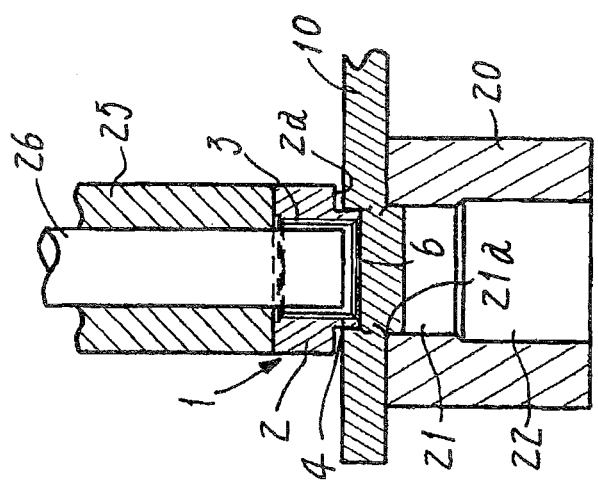

FIGS. 6A to 6C show a punching and fixing step of fixing the piercing nut 1 to the metal plate 10 by using the punching die 20 which is selected as mentioned above. The metal plate 10 is mounted on the upper face of the punching die 20, and the piercing nut 1 is pressed by a cylindrical striking punch 25 in a state in which the end face 6 of the pilot portion 4 is brought into contact with the metal plate 10 so as to be positioned and held coaxially with the punching die 20, whereby the pilot portion 4 is struck into the metal plate 10. To the striking punch 25, there is fitted a protruding pin 26 which is arranged so as to be movable up and down with respect to the thread hole 2 of the piercing nut 1.

FIG. 6A shows a state in which the pilot portion 4 is struck into the metal plate 10 and the punching work is started. A shear is generated between a peripheral edge of the end face 6 of the pilot portion 4 and an upper end opening edge 21a of the punching hole 21 of the punching die 20.

FIG. 6B shows a state in which the applied pressure of the striking punch 25 is further increased, the pilot portion 4 is further struck into the metal plate 10, and the shear of the punching work is completed. The punching opening portion 11 is formed in the metal plate 10, and the punching slag 12 is generated. In this state, when the piercing nut 1 is further pressurized, the bearing surface 2a of the nut main body 2 is pressed to the surface of the metal plate 10, and the punching opening portion 11 engages into the outer peripheral surface of the pilot portion 4, and the piercing nut 1 is fixed to the metal plate 10. At this time, since the outer peripheral surface 5 of the pilot portion 4 is formed into a tapered shape which is slightly contracted from the end face 6 toward the bearing surface 2a, and a plurality of concave grooves 7 extending axially at the even intervals in the circumferential direction are provided in the outer peripheral surface 5, the piercing nut 1 fixed to the metal plate 10 can obtain sufficient drawing drag and rotational drag. Further, the end face 6 of the pilot portion 4 is positioned inside a rear face of the metal plate 10 without passing through the metal plate 10. In this way, when the pilot portion 4 does not pass through the metal plate 10 and the piercing nut 1 is fixed, it is advantageous at the time of screwing a male thread such as a bolt into the thread hole 3 from the rear face side of the metal plate 10 so as to screw fasten.

On the other hand, the punching slag 12 is left between the punching opening portion 11 of the metal plate 10 and the punching hole 21 of the punching die 20 while the shear surface 13 having the length (L) which is about 50% of the thickness (T) of the metal plate 10 and the fracture surface 14 are formed in the outer peripheral surface thereof.

Subsequently, as shown in FIG. 6C, the protruding pin 26 fitted to the striking punch 25 so as to be movable up and down moves downward, and protrudes the punching slag 12 so as to discharge from the punching hole 21 of the punching die 20 through a discharge hole 22, and the punching and fixing step of the piercing nut 1 is completed.

Figure 7C:
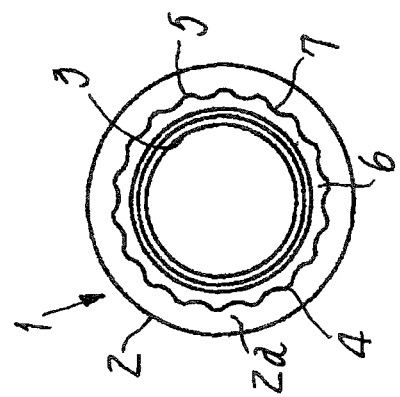
Figure 7B:
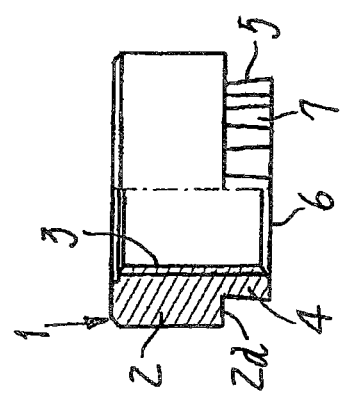
Figure 7A:
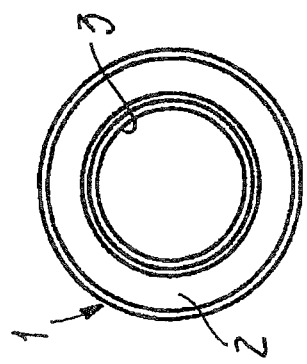
Figure 8C:
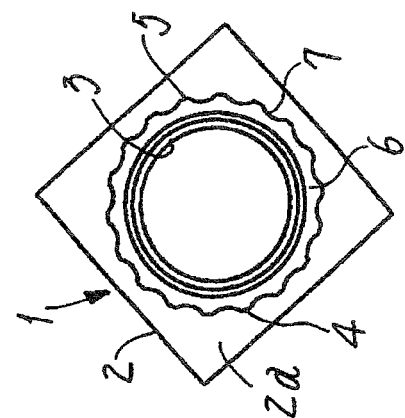
Figure 8B:
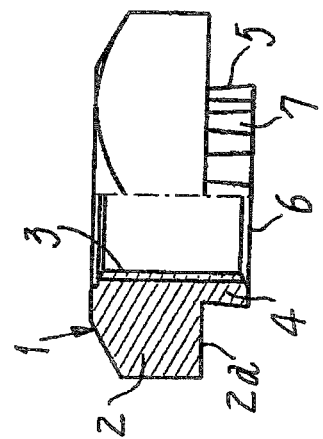
Figure 8A:
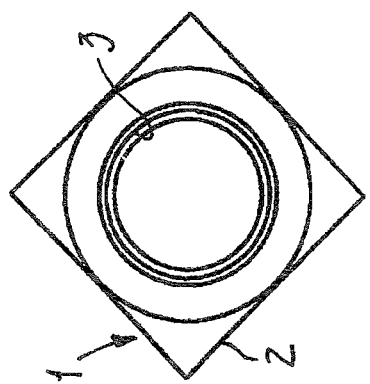

FIGS. 7A to 8C show a modified example of the piercing nut used in the fixing method according to the embodiment of the present invention, FIGS. 7A to 7C show a round type in which the nut main body is formed into a columnar shape, and FIGS. 8A to 8C show a rectangular type in which the nut main body is formed into a quadrangular shape.

According to the embodiment of the present invention, since the height of the pilot portion of the piercing nut is made smaller than the thickness of the fixed metal plate, and the concave portion such as the annular groove is not provided in the bearing surface of the nut main body, it is possible to downsize the piercing nut, and since the pilot portion does not protrude to the rear face of the metal plate, it is advantageous for a thread fastening work.

Further, since the pilot portion punched to the metal plate does not pass through the metal plate, and the punching step is finished when the shearing is completed, the fixing method according to the embodiment of the present invention is suitable for fixing the piercing nut to a comparatively thick steel plate having a thickness (T) between 3.0 mm and 12.0 mm.

Further, since it is not necessary to provide the caulking projection in the punching die, a service life of the die is greatly extended.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for fixing a piercing nut, comprising:

placing on a punching die a metal plate having a first surface and a second surface opposite to the first surface in a thickness direction of the metal plate so that the second surface comes into contact with the punching die;

providing a pilot portion having a center axis at a bearing surface of a nut main body of the piercing nut to protrude from the bearing surface to serve as a piercing punch, the pilot portion having an outer peripheral surface that extends in a direction substantially perpendicular to the bearing surface, the bearing surface being an entirely planar surface that continuously extends from the outer peripheral surface of the pilot portion to an outermost side surface of the piercing nut, a height from the bearing surface to an end face of the pilot portion being smaller than a thickness of the metal plate prior to contact with the piercing nut, the thickness being in the thickness direction of the metal plate, the punching die and the piercing nut provided such that a clearance is between 7% and 16% of the thickness of the metal plate, and wherein the clearance is defined as being equal to half of a difference between an outer diameter of the pilot portion and an inner diameter of a punching hole of the punching die, the nut main body including a thread hole having the center axis;

pressing the pilot portion of the piercing nut to the first surface of the metal plate placed on the punching die to be struck into the metal plate so that the bearing surface of the nut main body comes into contact with the first surface of the metal plate and an inner peripheral surface of a punching opening portion of the metal plate engages with the outer peripheral surface of the pilot portion to fix the piercing nut to the metal plate, the end face of the pilot portion being positioned between the first surface and the second surface of the metal plate without passing through the metal plate to leave a punching slag between the punching opening portion of the metal plate and a punching hole of the punching die; and pushing the punching slag downwardly by moving a protruding pin downwardly in the thread hole of the piercing nut to discharge the punching slag to the punching hole of the punching die.

2. The method for fixing a piercing nut according to claim 1, wherein the outer peripheral surface of the pilot portion is formed into a tapered shape which is slightly contracted from the end face toward the bearing surface of the nut main body, and wherein a plurality of concave grooves are provided in the outer peripheral surface.

3. The method for fixing a piercing nut according to claim 2, wherein the metal plate is made of a steel plate having a thickness between 3 mm and 12 mm.

4. The method for fixing a piercing nut according to claim 1, wherein the metal plate is made of a steel plate having a thickness between 3 mm and 12 mm.

5. The method for fixing a piercing nut according to claim 1, wherein the planar surface of the bearing surface extends around an entirety of an outer circumference of the pilot portion.

6. A method for fixing a piercing nut, comprising:

placing on a punching die a metal plate having a first surface and a second surface opposite to the first surface in a thickness direction of the metal plate so that the second surface comes into contact with the punching die;

providing a pilot portion having a center axis at a bearing surface of a nut main body of the piercing nut to protrude from the bearing surface to serve as a piercing punch, the pilot portion having an outer peripheral surface that extends in a direction substantially perpendicular to the bearing surface, the bearing surface being an entirely planar surface that continuously extends from the outer peripheral surface of the pilot portion to an outermost side surface of the piercing nut, the nut main body including a thread hole having the center axis, a height from the bearing surface to an end face of the pilot portion being 60% to 90% of a thickness of the metal plate prior to contact with the piercing nut, the thickness being in the thickness direction of the metal plate;

pressing the pilot portion of the piercing nut to the first surface of the metal plate placed on the punching die to be struck into the metal plate so that the bearing surface of the nut main body comes into contact with the first surface of the metal plate and an inner peripheral surface of a punching opening portion of the metal plate engages with the outer peripheral surface of the pilot portion to fix the piercing nut to the metal plate, the end face of the pilot portion being positioned between the first surface and the second surface of the metal plate without passing through the metal plate to leave a punching slag between the punching opening portion of the metal plate and a punching hole of the punching die; and pushing the punching slag downwardly by moving a protruding pin downwardly in the thread hole of the piercing nut to discharge the punching slag to the punching hole of the punching die.

7. The method for fixing a piercing nut according to claim 6, wherein the punching die and the piercing nut are provided such that a clearance is between 7% and 16% of the thickness of the metal plate, and wherein the clearance is defined as being equal to half of a difference between an outer diameter of the pilot portion and an inner diameter of a punching hole of the punching die.

8. The method for fixing a piercing nut according to claim 7, wherein the outer peripheral surface of the pilot portion is formed into a tapered shape which is slightly contracted from the end face toward the bearing surface of the nut main body, and a plurality of concave grooves are provided in the outer peripheral surface.

9. The method for fixing a piercing nut according to claim 8, wherein the metal plate is made of a steel plate having a thickness between 3 mm and 12 mm.

10. The method for fixing a piercing nut according to claim 7, wherein the metal plate is made of a steel plate having a thickness between 3 mm and 12 mm.

11. The method for fixing a piercing nut according to claim 6, wherein the outer peripheral surface of the pilot portion is formed into a tapered shape which is slightly contracted from the end face toward the bearing surface of the nut main body, and a plurality of concave grooves are provided in the outer peripheral surface.

12. The method for fixing a piercing nut according to claim 11, wherein the metal plate is made of a steel plate having a thickness between 3 mm and 12 mm.

13. The method for fixing a piercing nut according to claim 6, wherein the metal plate is made of a steel plate having a thickness between 3 mm and 12 mm.

14. The method for fixing a piercing nut according to claim 6, wherein the planar surface of the bearing surface extends around an entirety of an outer circumference of the pilot portion.

* * * * *